Nov. 4, 1941.    H. S. CAMPBELL    2,261,337
AIRCRAFT EQUIPPED WITH A SUSTAINING ROTOR
Filed Jan. 24, 1940    3 Sheets-Sheet 1

INVENTOR:
Harris S. Campbell
BY
Synnestvedt & Lechner
ATTORNEYS.

Nov. 4, 1941.   H. S. CAMPBELL   2,261,337
AIRCRAFT EQUIPPED WITH A SUSTAINING ROTOR
Filed Jan. 24, 1940   3 Sheets-Sheet 2

INVENTOR:
Harris S. Campbell
BY
Synnestvedt & Lechner
ATTORNEYS.

Patented Nov. 4, 1941

2,261,337

UNITED STATES PATENT OFFICE 2,261,337

AIRCRAFT EQUIPPED WITH A SUSTAINING ROTOR

Harris S. Campbell, Bryn Athyn, Pa., assignor to Autogiro Company of America, Willow Grove, Pa., a corporation of Delaware Application January 24, 1940, Serial No. 315,311

13 Claims. (Cl. 244—18)

This invention relates to aircraft equipped with a sustaining rotor, or rotors, of the type having one or more blades which are pivotally mounted for swinging movement at least a component of which movement lies in a direction generally transverse the mean path of rotation of the blade, i. e., in a "flapping" sense.

The invention, moreover, has particular reference to that type of sustaining rotor in which provision is made for controllably tilting the hub or a part thereof so as to shift the lift line of the rotor for maneuvering and control of the aircraft in flight.

It is a primary object of the invention to bring about improvement, both structurally and functionally, in a controllably tiltable rotor hub of the character mentioned. One aspect of the invention contemplates improvement in the control system itself, and another aspect contemplates a novel arrangement of certain rotor hub parts which effect a substantial reduction in, if not elimination of, certain loads which in prior hubs have been transmitted to the control system, at least under some conditions. In further explanation of this latter point, the following should be noted:

In aircraft equipped with a sustaining rotor as briefly mentioned above, it has been customary to provide some form of "droop" supporting means arranged to prevent excessive downward swinging movement of the blades when at rest or not rotating at flight speed, the purpose being to avoid fouling of the blade or blades on other parts of the aircraft, such as the forward propulsion airscrew or tail surfaces.

In the type of rotor mentioned, equipped with means for tilting the rotor for control purposes, the droop supports or stops have customarily been mounted on or connected with a part of the rotative hub assembly which follows the tilting movements. This prior arrangement has given rise to several problems or difficulties, perhaps the most important of which relates to the transmission of certain heavy loads from the tiltable hub part to the control system, under certain conditions.

The conditions in question arise chiefly when starting and stopping the rotor. To illustrate— assume that a landing has just been made and that the rotor is slowing down. If, at this time, due to a wind gust or the like, a blade at one side of the rotor is raised and then dropped so as to "bottom" on the droop support for that blade, a very powerful force is set up tending to tilt the hub and in consequence to move the control system. The following figures demonstrate the possible magnitude of forces of this type.

In an aircraft of about 1400 pounds total weight and equipped with one three bladed rotor, the blades being about 20 feet in length, each blade would normally weigh in the neighborhood of 50 pounds, the center of gravity being about 9 feet from the center of rotation. With a design load factor of 4 the design flapping moment which could be developed by one blade bottoming on its droop support would be—

(9) (12) (50) (4) = 21,600 lbs.

Even with a 60 to 1 reduction ratio in the control system, the design load at the control stick would be about 350 pounds. A load of this magnitude is unmanageable and dangerous to the pilot, necessitating locking of the control stick. Moreover, even if the control stick is locked, the control system must be excessively heavy and rugged to withstand such heavy loads.

One of the primary objects of the invention is the provision of means eliminating or at least greatly reducing loads transmitted to the control system under conditions of the type mentioned above. A related advantage flowing from this is that the control system may be of much lighter construction than necessary heretofore.

The prior practice of mounting the droop supports for the blades on a part of the hub which is tiltable therewith has also necessitated mounting the rotor higher than was necessary with a non-tiltable hub, in order, under all conditions, to provide adequate blade clearance over the tail surfaces and propeller.

With this prior arrangement if the rotor hub is tilted when the blades are resting on the droop stops, as when the rotor is stationary or rotating very slowly, the blades are caused to "droop" excessively in the direction of hub tilt.

The invention also eliminates the necessity for the very large mean blade clearance over the tail and propeller required by the foregoing conditions.

Generally considered, the present invention achieves the foregoing objects and advantages by the employment of droop supporting means connected with a non-tiltable part of the hub and by employing flapping pivots for the blades having their axes passing close to or intersecting the rotational axis of the hub. In this way blade "droop" loads are eliminated from the control system and, in addition, it is possible to reduce the mean clearance between the blades and the droop stops, this latter, in turn, being of advantage since it permits lowering the rotor, without danger of the blades fouling either the tail surfaces or the airscrew.

How the foregoing and other objects and advantages are attained will appear more fully from the following description referring to the accompanying drawings, in which—

Figure 1:
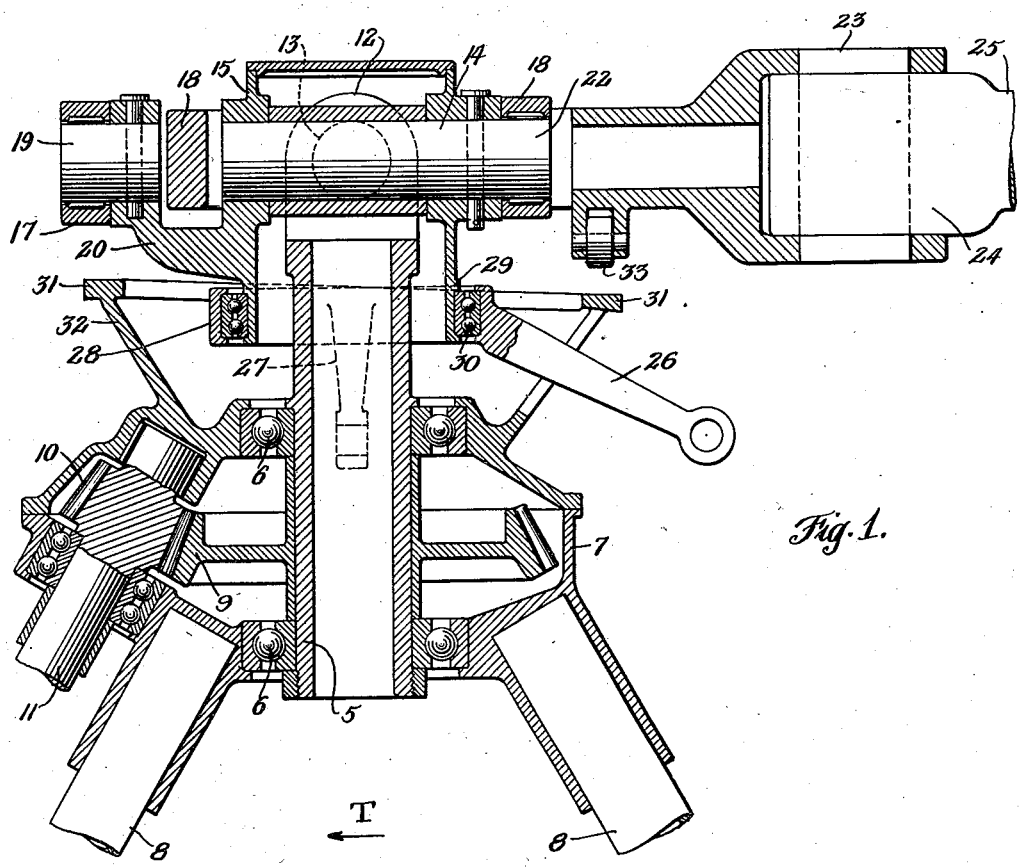
Figure 1 is a vertical sectional view through the hub and blade mounting parts of a three bladed rotor constructed in accordance with the present invention.
Figure 2:
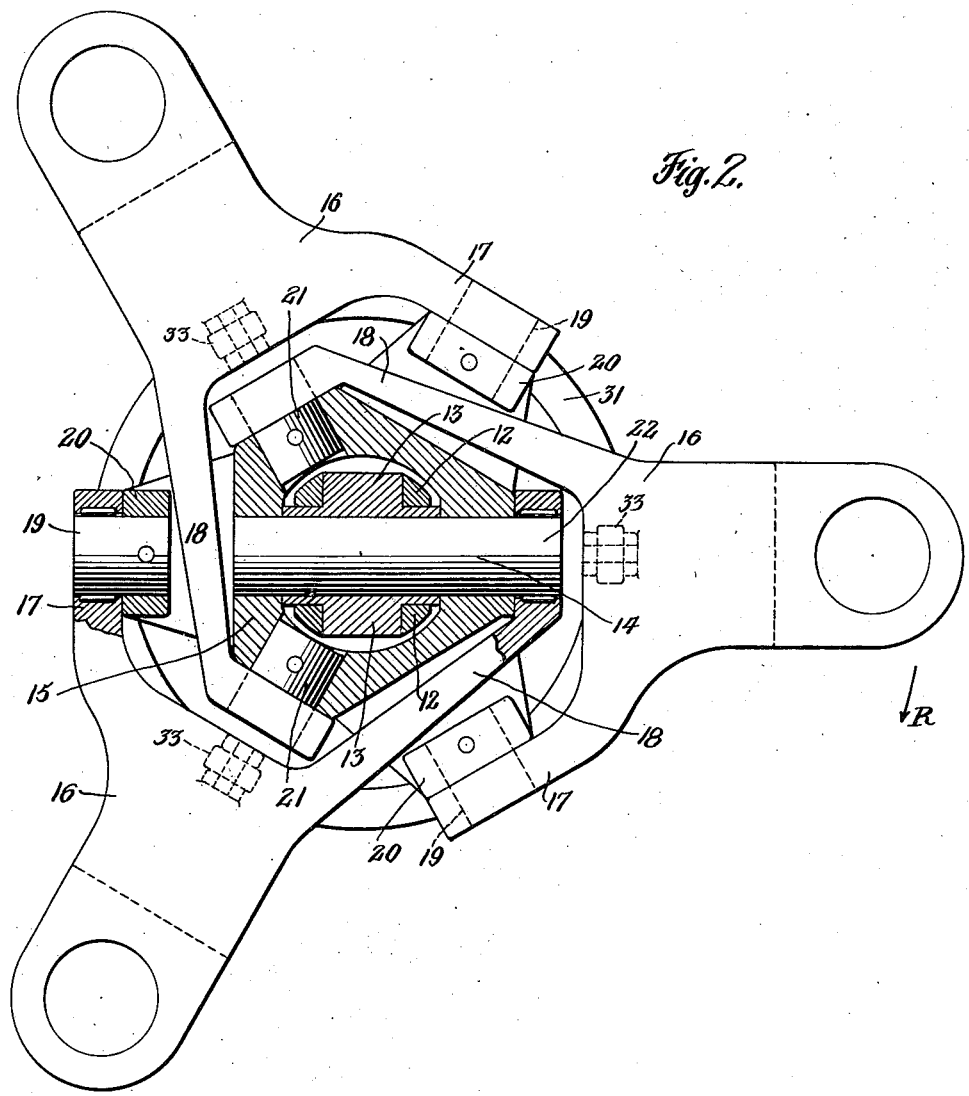
Figure 2 is a plan view of the mechanism shown in Figure 1, with certain parts illustrated in horizontal section.

In the form of Figures 1 and 2, a rotative hub spindle 5 is journalled by bearings 6—6 in a housing 7 which may be supported above the body of the aircraft in any suitable manner as by the pylon struts 8. A rotor drive mechanism may be employed including a driven gear 9 connected with the hub spindle 5 and meshing with a cooperating driving pinion 10 mounted at the upper end of shaft 11 which may be extended downwardly to the body of the aircraft for connection with any suitable power plant, such as the engine employed to drive a forward propulsion airscrew. Suitable clutches, preferably an overrunning clutch and a manually operable clutch (not shown) would normally be incorporated in the rotor drive. This drive may be employed either for starting the rotor prior to making a take-off run, or for effecting jump take-off (for example, in the manner described in copending application of Juan de la Cierva, Serial No. 738,349, filed August 3rd, 1934), or for continuous drive of the rotor during flight, as in helicopter type operation.

Toward its upper end the hub spindle 5 is provided with a pair of spaced and apertured lugs 12—12 adapted to receive and support trunnions 13—13 formed on a universal block, which block also cooperates with pin 14 the axis of which is arranged at right angles to the axis of trunnions 13—13. A hub member 15 is mounted on pin 14 and is, therefore, supported for universal tilting movement.

Each blade is adapted to be coupled to the hub member 15 by means of a fork 16 the prongs 17 and 18 of which are extended to embrace the hub and the prongs of the respective blade forks being in serially overlapping positions. Prong 17 of each blade mounting fork is connected with the hub member 15 by means of pivot pin 19 which is mounted on a bracket 20 extending outwardly from the hub member 15. The other prong of each fork (18) is pivoted to the central part of the hub member 15, the pivots for this purpose including pivot pins 21—21 for two of the blades and an extension 22 formed at one end of the pin 14 of the universal, for the third blade. The double use of pin 14 as a pivot part for tilting the hub and also as a pivot part for one of the blades is of substantial advantage, especially in a three bladed rotor incorporating interleaving forks, as shown, pivoted to the hub on axes intersecting the hub axis. By this means certain hub dimensions may be noticeably decreased, as will be apparent particularly from inspection of Figure 2.

With regard to the pivot devices just mentioned, it will be noted that each blade is thereby provided with a flapping pivot axis intersecting the rotational axis of the hub. Each blade is thus free to swing in a direction generally transverse its mean rotative path of travel under the influence of aerodynamic forces of flight.

In the plan pattern of blade pivots as shown in Figure 2, the flapping pivot axis for each blade is oblique with respect to the longitudinal axis of the blade, the obliquity being such that when viewed in plan the pivot axis forms an acute angle with the blade axis at the leading side of the latter, the direction of rotation being indicated by the arrow R in Figure 2. Referring still further to the plan pattern of the blade forks and pivots, it should be noted that the particular angularity of the flapping pivot axis is not of material consequence to at least most features of the present invention, although it is of substantial importance to the features hereinafter described that the flapping pivot axes intersect or at least pass close to the rotational axis of the hub.

It may here be noted that certain features of the blade fork pattern described above are more fully described and claimed in copending application of Agnew E. Larsen, Serial No. 271,841, filed May 5, 1939.

Connection of the blades to the several blade mounting forks 16 is preferably accomplished by use of a drag pivot 23 which cooperates with an apertured eye 24 connected with the root end 25 of the blade.

Tilting of the hub for control purposes may be effected by means of a pair of control arms 26 and 27 connected with a ring 28, the arms being extended from the ring at right angles to each other. Ring 28 is non-rotative but is mounted on the cylindrical part 29 depending from the hub member 15, a bearing 30 being interposed between the ring 28 and the cylindrical part 29. As shown in Figure 1, the control arm 26 serves for tilting the rotor hub in a fore and aft plane, the forward direction or direction of translational flight being indicated in this figure by the arrow T. Arm 27 serves for lateral tilt, it being understood, of course, that the two arms are coupled by any suitable control system with a pilot's control element in the fuselage, such as the usual control column or stick.

In accordance with the present invention, downward swinging or "drooping" of the blades on the flapping pivots is limited by a non-rotative and non-tiltable droop supporting means taking the form of a ring or track 31 which is supported on the fixed rotor mount 7 by means of a conical web 32. While each blade fork may be provided with a pad or shoe adapted to rest and slide on ring 31 when the blades are in drooped position, I prefer to mount a roller 33 at the underside of each blade fork so positioned as to ride on the ring or track 31 and thereby reduce friction.

The foregoing arrangement, with the flapping pivot axes close to or intersecting the rotational axis of the hub, results in substantially direct transmission of "drooping" loads from the blades to fixed mounting structure, thereby relieving the control system of said loads. In fact, with the flapping pivot axes intersecting the hub axis and with the point of droop support for the blade lying on a line joining the hub axis and the center of gravity of the blade, all "drooping" loads are completely eliminated from the control system. With this in mind, I prefer to locate the droop supporting roller 33 for each blade in the manner just indicated. Where a drag pivot (such as indicated at 23 in Figure 1) is employed, angular movement of the blade about the drag pivot axis will, of course, move the center of gravity of the blade fore and aft, but since the lag-lead movement on the drag pivot is ordinarily restricted to within relatively small angular limits, only relatively minor loads would be thrown into the control system even with maximum deflection of the blade about the drag pivot axis.

By virtue of the arrangement described, tilting movement of the hub (in contrast with prior arrangements) does not result in corresponding movement of the blade droop supports and, in consequence, the rotor may be mounted at a lower level, without danger of fouling of the blades on the empennage surfaces or any other part of the machine.

In flight, the blades assume an average position which is coned upwardly, the average coned position of the blades toward the front of the machine being higher than that toward the rear of the machine. With this in mind, the droop supporting ring 31 is desirably inclined from a high point toward the front to a low point toward the rear, as is plainly seen in Figure 1. This permits still lower mounting of the rotor without danger of the blades striking the propeller or tail.

The arrangement described above indicates one mode of applying the invention to a three bladed rotor. The invention is also applicable to rotors having fewer or more blades, an embodiment as applied to a two bladed rotor being illustrated in Figures 3 and 4 described herebelow.

Figures 3, 4:
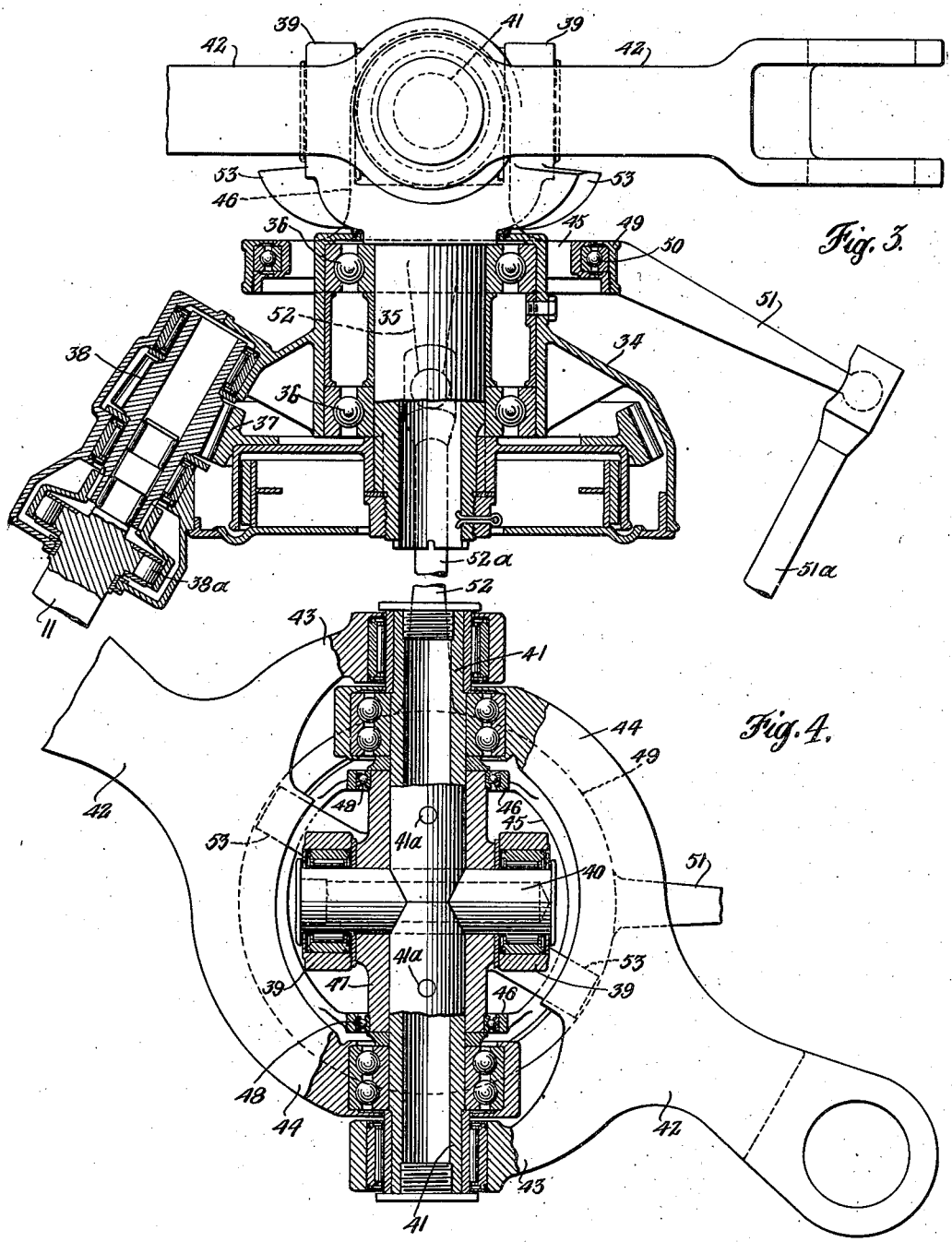
Figures 3 and 4 are views similar to Figures 1 and 2, respectively, but illustrating a modified arrangement as applied to a two bladed rotor.

In Figure 3 a fixed rotor supporting structure is indicated at 34, a rotative hub spindle 35 being journalled in the fixed support by means of bearings 36—36. Here again, if desired, a rotor drive may be employed, incorporating a gear 37 secured to the hub spindle and adapted to be driven by pinion 38 through overrunning clutch 38a.

In the arrangement of Figures 3 and 4, the upper end of the hub spindle is equipped with a pair of spaced upstanding apertured lugs 39—39 which serve to journal the transverse pivot 40 arranged at right angles to the aligned pins 41—41. Pivot 40 and pins 41—41 project through a block 47, the pins 41—41 being secured therein as indicated at 41a—41a. The pivot 40 and the pins 41—41 provide a pair of right angle universal joint axes by means of which tilting for control is effected.

The pivot parts 41—41 are extended sufficiently to provide for connection of the two blades therewith, this being accomplished by blade mounting forks 42 each of which has a pair of prongs 43 and 44, one being journalled on one pin 41 and the other on the other pin 41. The mounting of the fork prongs on the pins 41—41, therefore, provides freedom for flapping movement of the blades about a common flapping pivot axis, which is further coincident with one of the axes of tilting employed for control. The arrangement of Figures 3 and 4, therefore, in common with the form first described, employs pivot parts serving a double purpose, i. e., for movement of the blade in response to control forces, and for blade flapping movement.

Tilting may be accomplished by means of a ring 45 lying in a generally horizontal plane below the level of the blades and carrying a pair of rings 46—46 lying in generally upright planes, the latter rings surrounding the universal block 47 which is mounted on the pivot pins 40 and 41—41. Bearings 48 are preferably interposed between the block 47 and the rings 46. Provision is made for controllably tilting ring 45 in any direction, the means provided for this purpose including a non-rotative ring 49 mounted on ring 45 by means of the bearing 50. A pair of control arms 51 and 52, coupled by suitable linkage 51a—51a, with a control stick or the equivalent in the pilot's compartment, provide for tilting of both of the rings 45 and 49 in the desired sense.

This tilting control system functions in the following manner:

Assuming a tilting of the rings 45 and 49 downwardly at the front and upwardly at the rear (downwardly at the left and upwardly at the right when viewed as in Figure 3), with the blades positioned as shown in Figure 3, the rings 46—46 will merely turn on the universal block 47 about the axis of the pivot parts 41—41. However, as the blades rotate through 90°, carrying with them the ring 45, the axis of pivots 41—41 will be inclined to an extent corresponding to the inclination of rings 45 and 49. This, in turn, will cause a change in the pitch of the two opposite blades at this point in the circle of rotation and the desired controlling moment is thereby secured.

The unusual simplicity, and the exceptionally few hub and tilting control parts required are substantial advantages of the arrangement shown in Figures 3 and 4. Furthermore, these features effectively cooperate with non-tiltable droop supports which, according to the invention, take the form of droop stops 53 formed on or secured to the rotative hub spindle 35 or the lugs 39—39 projecting upwardly therefrom. Each stop 53 is extended radially outwardly to a position below the base part of one of the blade mounting forks 42 and is arranged to engage the base part of the fork substantially on the line joining the hub axis and the center of gravity of the blade.

While the stops 53 in the arrangement of Figures 3 and 4 rotate with the rotor, which is in contrast with the arrangement of Figures 1 and 2, at the same time, both arrangements have in common that the blade droop supporting means is mounted on a part of the rotor head or mount which is not tiltable for control. The arrangement of Figures 3 and 4 is of particular advantage since it involves no relative rotational movement between the complementary blade droop supporting means on the blades and the hub.

In conclusion, it may be noted that, as in the arrangement of Figures 1 and 2, the application of the non-tiltable droop stops to the structure of Figures 3 and 4 does not necessitate use of flapping pivots for the blades of any special angularity. Thus, while as shown in Figure 4, the flapping pivot axis (axis of parts 41—41) forms an acute angle with the longitudinal axis of each blade, at the leading side of the latter, the blade forks could be of different shape to provide a different angularity, for instance an angle of 90° between the flapping axis and the blade axis.

However, as above noted, it is of distinct advantage in both forms disclosed to employ flapping pivot axes which intersect or pass close to the rotor axis, since, with substantial offset of the flapping pivot axes, blade "drooping" loads would again be introduced into the control system, although to a lesser extent than with previous types of droop stops.

I claim:

1. An aircraft sustaining rotor including a blade, a rotor head structure incorporating a pair of rotatable members one of which is tiltably mounted on the other, pivot means connecting the blade with the tiltable member to provide freedom for swinging movement of the blade in a direction generally transverse its mean path of rotation about an axis substantially intersecting said axis of rotation, controllable means for effecting tilting of said tiltable member to shift the lift line of the rotor for control purposes, and a blade droop support adapted to cooperate with the blade to limit downward swinging movement thereof, said droop support being mounted on a non-tiltable part of said head structure.

2. An aircraft sustaining rotor including a blade, a pair of rotatable hub members one of which is tiltably mounted on the other, pivot means connecting the blade with the tiltable member to provide freedom for swinging movement of the blade in a direction generally transverse its mean path of rotation, controllable means for effecting tilting of said tiltable member to shift the lift line of the rotor for control purposes, and a blade droop support adapted to cooperate with the blade to limit downward swinging movement thereof, said droop support being mounted on said non-tiltable member.

3. An aircraft sustaining rotor including a blade, a rotatable and tiltable hub member, pivot means connecting the blade with the hub member to provide freedom for swinging movement of the blade in a direction generally transverse its mean path of rotation, controllable means for effecting tilting of said tiltable member to shift the lift line of the rotor for control purposes, and a non-rotative and non-tiltable blade droop supporting means adapted to limit downward swinging movement of the blade.

4. An aircraft sustaining rotor including a blade, a rotatable and tiltable hub member, pivot means connecting the blade with the hub member to provide freedom for swinging movement of the blade in a direction generally transverse its mean path of rotation, controllable means for effecting tilting of said tiltable member to shift the lift line of the rotor for control purposes, and a non-rotative and non-tiltable ring surrounding the hub and adapted to limit downward swinging movement of the blade at any rotative position of the latter.

5. An aircraft sustaining rotor including a blade, a rotatable and tiltable hub member, pivot means connecting the blade with the hub member to provide freedom for swinging movement of the blade in a direction generally transverse its mean path of rotation, controllable means for effecting tilting of said tiltable member to shift the lift line of the rotor for control purposes, and a non-rotative and non-tiltable ring surrounding the hub and adapted to limit downward swinging movement of the blade at any rotative position of the latter, portions of said ring being at different levels whereby to limit drooping of the blade to different angles at different points in the circle of rotation.

6. An aircraft sustaining rotor including a blade, a rotatable and tiltable hub member, pivot means connecting the blade with the hub member to provide freedom for swinging movement of the blade in a direction generally transverse its mean path of rotation, controllable means for effecting tilting of said tiltable member to shift the lift line of the rotor for control purposes, and a non-rotative and non-tiltable ring surrounding the hub and adapted to limit downward swinging movement of the blade at any rotative position of the latter, together with rolling means providing free relative rotation of the blade and droop supporting ring when the blade is in drooped position.

7. An aircraft sustaining rotor including a blade, a rotor head structure incorporating a pair of rotatable members one of which is tiltably mounted on the other, pivot means connecting the blade with the tiltable member to provide freedom for swinging movement of the blade in a direction generally transverse its mean path of rotation, controllable means for effecting tilting of said tiltable member to shift the lift line of the rotor for control purposes, and a blade droop support adapted to cooperate with the blade to limit downward swinging movement thereof, said droop support being mounted on a non-tiltable part of said head structure.

8. An aircraft sustaining rotor including a blade, a rotative hub spindle, a blade supporting device tiltably mounted on said spindle, pivot means connecting the blade with said device providing freedom for swinging movement of the blade in a direction generally transverse its mean rotative path of travel, controllable means for tilting said device with respect to the rotative hub spindle to shift the lift line of the rotor for control purposes, and a blade droop support connected with the rotatable spindle and adapted to limit downward swinging movement of the blade.

9. An aircraft sustaining rotor including a blade, a rotor head structure incorporating a rotatable and tiltable hub member, pivot means connecting the blade with said hub member to provide freedom for swinging movement of the blade in a direction generally transverse its mean path of rotation, controllable means for effecting tilting of said hub member to shift the lift line of the rotor for control purposes, and a blade droop support mounted on a non-tiltable part of said rotor head structure and adapted to cooperate with the blade substantially on a line joining the hub axis and the center of gravity of the blade.

10. An aircraft sustaining rotor including a blade, a rotor head structure incorporating a rotatable and tiltable hub member, pivot means connecting the blade with the hub member to provide freedom for swinging movement of the blade in a direction generally transverse its mean path of rotation about an axis substantially intersecting said axis of rotation, controllable means for effecting tilting of said hub member to shift the lift line of the rotor for control purposes, and a blade droop support adapted to cooperate with the blade to limit downward swinging movement thereof, said droop support being mounted on a non-tiltable part of said head structure.

11. A bladed aircraft sustaining rotor including a hub, a blade mounting fork embracing the hub, a hub supporting member, and a pivot device pivotally connecting the blade fork with the hub and pivotally connecting the hub with the hub support.

12. A hub assembly for a bladed aircraft sustaining rotor, including a universal block having a pair of relatively angled intersecting bores formed therein, a pair of relatively angled pivot devices in said bores and physically intersecting each other, a blade of the rotor being pivotally connected with one of said pivot devices to provide freedom for flapping movement of the blade, and a supporting member cooperating with the other of said pivot devices and providing freedom for tilting of said assembly.

13. A bladed aircraft sustaining rotor including a rotative hub member, mechanism for connecting the blade with the hub member incorporating a pair of relatively angled pivot devices one of which is pivotally associated with said member, and a blade mounting fork pivotally mounted on the other of said devices with the longitudinal axis of the blade oblique to the pivot axis, and controllable means for periodically tilting said second pivot device about the axis of the first pivot device synchronously with rotation of the rotor including a control connection coupled with said mechanism between the prongs of the blade mounting fork.

HARRIS S. CAMPBELL.